United States Patent [19]

Teshima

[11] Patent Number: 4,571,601
[45] Date of Patent: Feb. 18, 1986

[54] INK JET PRINTER HAVING AN ECCENTRIC HEAD GUIDE SHAFT FOR CLEANING AND SEALING NOZZLE SURFACE

[75] Inventor: Shoichi Teshima, Tokyo, Japan
[73] Assignee: NEC Corporation, Tokyo, Japan
[21] Appl. No.: 695,901
[22] Filed: Jan. 29, 1985
[30] Foreign Application Priority Data
  Feb. 3, 1984 [JP] Japan .................................. 59-19123
[51] Int. Cl.⁴ ........................................... G01D 15/18
[52] U.S. Cl. ............................................... 346/140 R
[58] Field of Search .................................. 346/140 PD
[56] References Cited
  U.S. PATENT DOCUMENTS 4,144,537  3/1979  Kimura et al. ............... 346/140 PD
  4,223,322  9/1980  van Raamsdonk .......... 346/140 PD
  4,306,245  12/1981 Kasugayama et al. ...... 346/140 PD
  4,364,065  12/1982 Yamamori et al. .......... 346/140 PD
  4,441,110  4/1984  Hatakeyama et al. ....... 346/140 PD
  4,533,927  8/1985  Iwagami et al. ............. 346/140 PD Primary Examiner—George H. Miller, Jr.
Attorney, Agent, or Firm—Laff, Whitesel, Conte & Saret

[57] ABSTRACT

An ink jet printer is disclosed wherein an ink writing head is reprocably movably mounted on an eccentric guide shaft to scan a print line during print mode and moved to a cleaning position outside the print line during non-print mode. A nozzle cleaning device movably supports a liquid-absorbing cleaning tape along a path parallel to and adjacent to the nozzle surface. A drive system turns the guide shaft about the eccentric axis thereof and moves the cleaning tape during the non-print mode so that the nozzle surface moves in a substantially circular path to permit a section of the tape to provide a wiping action over the nozzle surface. A nozzle sealing device is arranged to make contact with the nozzle surface when the latter is moving in the circular path and held in pressure tight contact with the nozzle surface after the drive system is de-energized.

6 Claims, 10 Drawing Figures

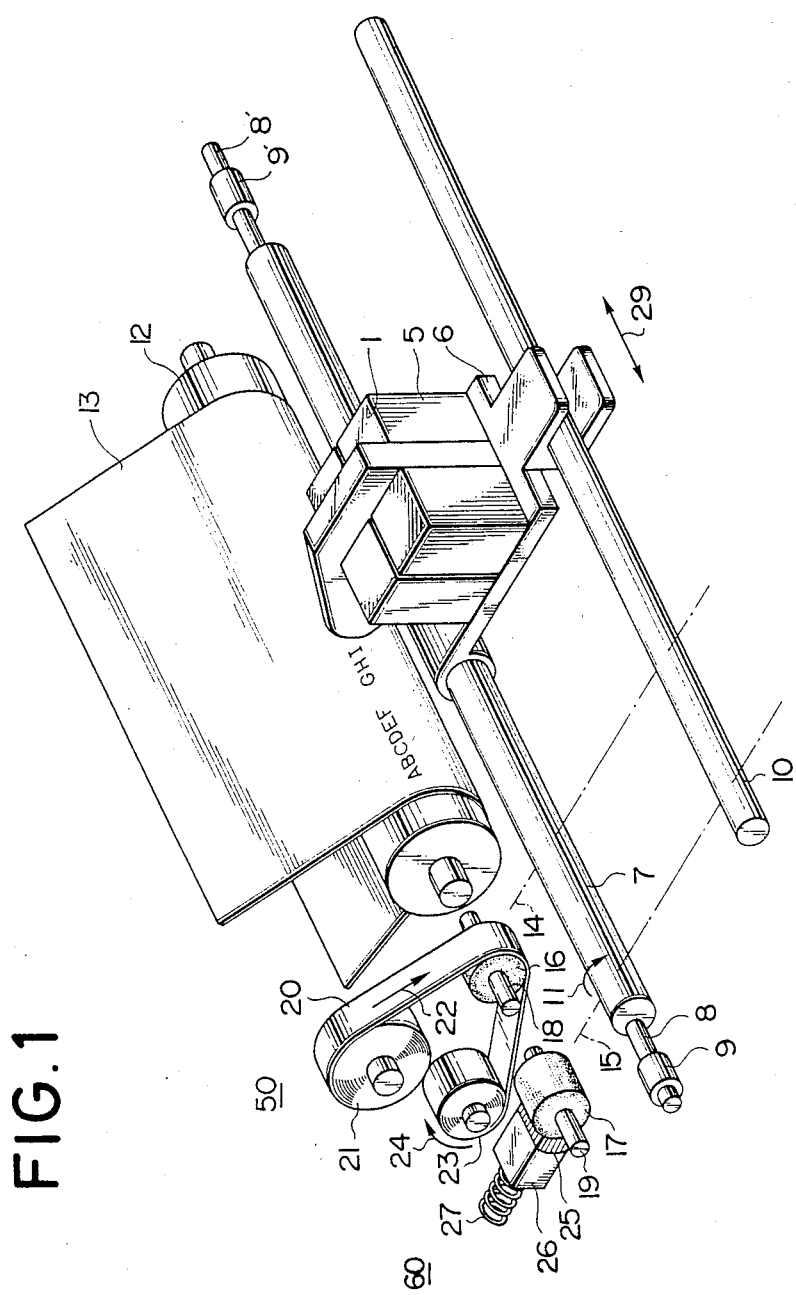

4,571,601

INK JET PRINTER HAVING AN ECCENTRIC HEAD GUIDE SHAFT FOR CLEANING AND SEALING NOZZLE SURFACE

BACKGROUND OF THE INVENTION

The present invention relates generally to ink jet printers of the on-demand type, and in particular to such printers having nozzle cleaning and sealing devices.

Ink jet printers of the on-demand type have been in widespread use because of their advantages in economy, noise performance and ease with which color printing can be implemented. However, one problem inherent in such on-demend type writing head is that due to the drying or thickening of residual ink in nozzle openings during non-print periods impurities tend to clog the nozzle passages or build up on nozzle surface smearing a writing surface.

An apparatus for cleaning the nozzle surface, as shown and described in U.S. Pat. No. 4,223,322, comprises a liquid-absorbing cleaning tape transported between supply and takeup reels to present a section of the tape to the nozzle surface of writing head when the latter is moved to a cleaning position during non-print period. The cleaning tape is placed against the nozzle surface of the writing head without pressure and without effecting any wiping action. The cleaning tape is held in contact with the nozzle surface for a period sufficient to permit ink to flow from the nozzles in a direction toward the cleaning medium, so that nozzle surface is wetted by liquid in which particles to be removed are dissolved. Due to the lack of wiping action, the prior art cleaning device has a low degree of efficiency and in the case of multi-color heads color mixing is likely to occur.

SUMMARY OF THE INVENTION

Accordingly, the present invention provides an ink jet printer wherein the nozzle surface of writing head is wiped by a liquid-absorbing cleaning medium by eccentric motion of the head.

The ink jet printer of the invention comprises an eccentric guide shaft on which the ink writing head is reciprocably moved to scan a print line during print mode and moved to a cleaning position outside the print line during non-print mode. A nozzle cleaning device movably supports a liquid-absorbing cleaning tape along a path parallel to and adjacent to the nozzle surface. A drive system turns the guide shaft about the eccentric axis thereof and moves the tape during the non-print mode so that the nozzle surface moves in a substantially circular path to permit a section of the tape to provide a wiping action over the nozzle surface.

Preferably, a nozzle sealing device is arranged to make contact with the nozzle surface when the latter is moving in the circular path and held in pressure tight contact with the nozzle surface after the drive system is de-energized.

BRIEF DESCRIPTION OF THE DRAWINGS

The present invention will be described in further detail with reference to the accompanying drawings, in which:

FIG. 1 is a perspective view of a portion of an ink jet printer embodying the present invention;

DETAILED DESCRIPTION

Figure 2A:
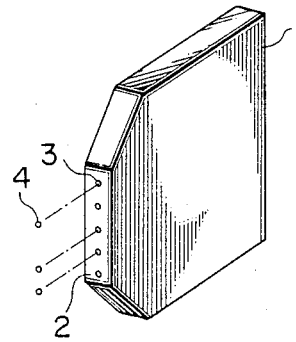
FIGS. 2a and 2b are typical examples of a single-color writing head and a multi-color writing head, respectively.

Referring now to FIG. 1, there is shown an ink jet printer embodying the present invention. An ink writing head 1 and an ink container 5 from which ink is supplied to the head are mounted on a carrier 6. Carrier 6 is slidably mounted at its forward end on an eccentric guide shaft 7 which is eccentrically connected at opposite ends to drive shafts 8, 8' mounted respectively on bearings 9, 9'. The rear end of carrier 6 is forked as shown to slidably engage a stationary shaft 10, which serves as a guide for the carrier to provide the reciprocating movement during print mode and permits the forward end of carrier 6 to provide a circular motion in response to rotation of eccentric shaft 7 in a manner as will be discussed later. Carrier 6 is driven by a well known mechanism, not shown, to scan across a recording medium 13 rolled on a platten 12 during print operation. During cleaning mode, carrier 6 is moved to a position indicated by a broken line 14 and during sealing mode it is moved to a far left position as indicated by a broken line 15.

Figure 2B:
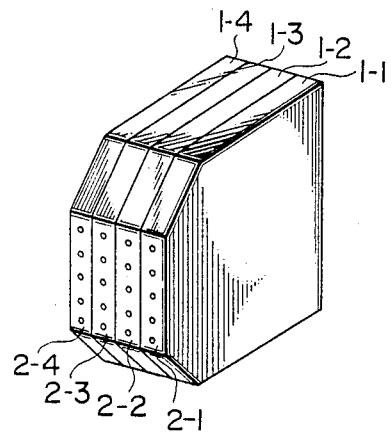

Writing head 1 comprises a multi-nozzle head as shown at FIG. 2a in which nozzle openings 3 are arranged vertically in series on a nozzle surface 2 to eject streams of ink 4 to the writing surface. In color printing, a multi-color writing head as shown in FIG. 2b may be employed in which writing head 1-1 to 1-4 of similar construction are arranged side-by-side so that their nozzle surfaces 2-1 to 2-4 lie on a common surface.

Returning to FIG. 1, a nozzle cleaning device 50, located in a position on line 14, comprises a supply reel 21, a takeup reel 23 located below supply reel 21 and an elastic roller 16 which is formed of silicon rubber, for example, and is located in a position adjacent to the nozzle surface when head 1 is in the cleaning position. A cleaning tape 20 is attached at opposite ends to supply reel 21 and takeup reel 23 and looped on roller 16. Cleaning tape 20 is formed of a liquid absorbing material having a sufficient tensile force to provide wiping contact with the nozzle surface 2. Suitable material for the cleaning tape is Japanese paper or industrial wiping paper and the like.

Figure 3:
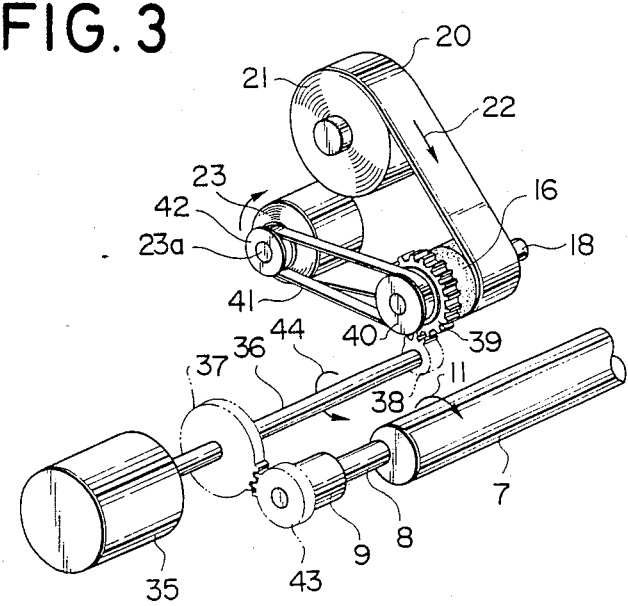
FIG. 3 is a perspective view of a portion of the printer showing the detail of a mechanism that drives an eccentric guide shaft and cleaning device of the invention.

Roller 16 is mounted on a shaft 18 on which a gear 39 is mounted as shown in FIG. 3 in mesh with a gear 38 mounted on a shaft 36 which is driven by a motor 35. A belt 41 is supported between pulleys 40 and 42 which are secured to roller shaft 18 and takeup reel shaft 23a, respectively, so that cleaning tape 20 is transported in a downward direction as indicated by arrow 22. On the shaft 36 is mounted a gear 37 which is in mesh with a gear 43 mounted on shaft 8 to drive the eccentric shaft 7 in clockwise direction as indicated by arrow 11.

A nozzle sealing device 60, located in a position on line 15, comprises an elastic sealing roller 17 formed of silicone rubber, the sealing roller 17 being mounted on a shaft 19 which is in turn rotatably mounted on a suitable support, not shown. A scraper 26 having a sharp edge portion 25 is held in pressure contact with the surface of roller 17 by means of a spring 27.

Figure 4A:
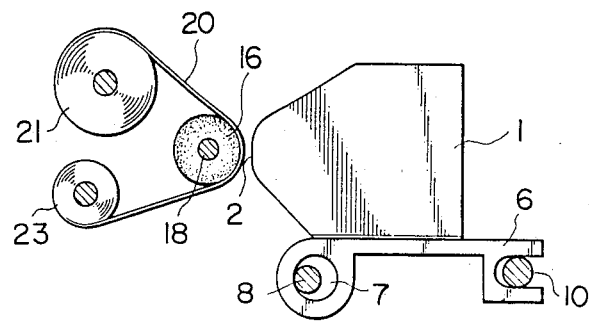
FIGS. 4a to 4d are end views useful for the description of the operation of the cleaning device.
Figure 4B:
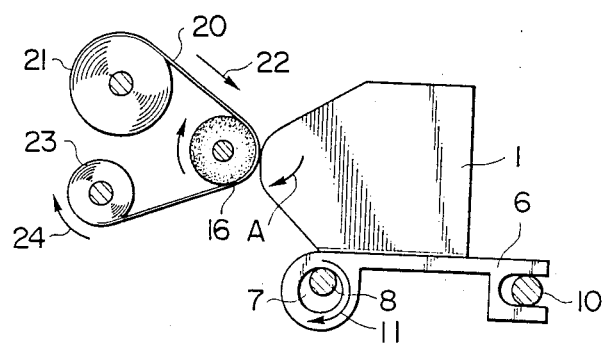
Figure 4C:
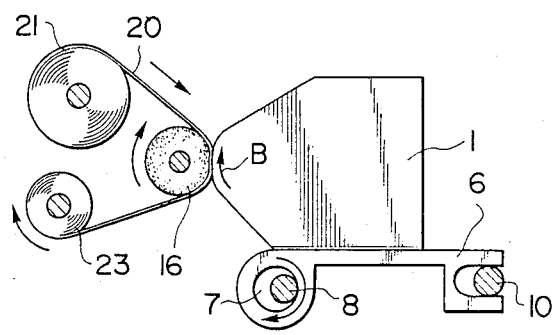
Figure 4D:
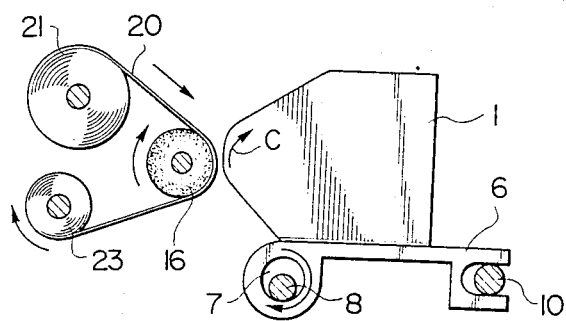

The operation of the cleaning device will be better understood with reference to FIGS. 4a to 4d. With the writing head being moved to the cleaning position indicated at 14 and the motor 35 de-energized, the nozzle surface 2 is opposed to a section of the cleaning tape which is wound on roller 21 as shown in FIG. 4a. Motor 35 is then energized to turn the eccentric shaft 7 in clockwise direction so that nozzle surface 2 starts moving in a circular motion, first following an arcuate downward path indicated by arrow A (FIG. 4b) to contact with the section of tape 20 which is moving downward around roller 16. Nozzle surface 2 then moves forward following an arcuate upward path indicated by arrow B. When this occurs a portion of roller 16 is depressed flat upon contact with the whole area of nozzle surface 2 so that impurities thereon are absorbed by tape 20 and completely removed therefrom, while tape 20 moves downward to provide a wiping action against the upwardly moving nozzle surface (FIG. 4c). Nozzle surface 2 finally disengages from contact with tape 20 by following a return path indicated by arrow C, FIG. 4d, and moves toward the position of FIG. 4a.

Figure 5A:
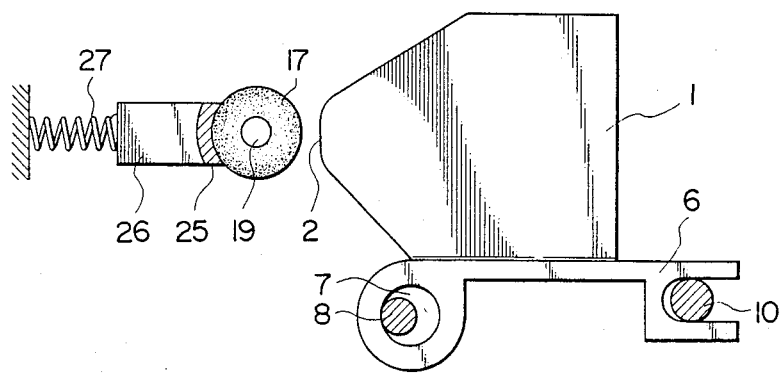
FIGS. 5a and 5b are end views useful for the description of the operation of a nozzle sealing device of the invention.
Figure 5B:
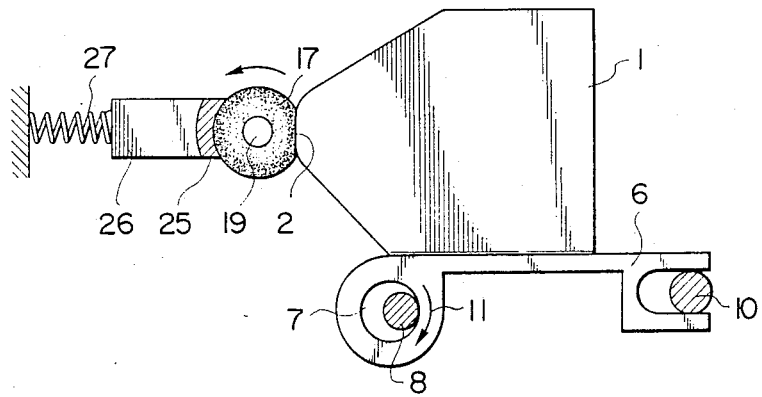

FIGS. 5a and 5b illustrate the operation of the sealing device 60. With the writing head being moved to the sealing position at 15, nozzle surface 2 comes to a position opposed to the surface of sealing roller 17 (FIG. 5a). Motor 35 is then energized to turn the eccentric shaft 7. In a manner identical to that described above, nozzle surface 2 moves in a circular path, first moving upward to make pressure contact with roller 17. Thus, roller 17 is depressed upon contact with the whole area of nozzle surface 2 against spring 27 and turned counterclockwise about shaft 19 as shown in FIG. 5b. Impurities on nozzle surface 2 are removed by sealing roller 17 and carried forward. Motor 35 is de-energized and the writing head is thereafter held in the position of FIG. 5b. In a subsequent sealing operation, sealing roller 17 will be further rotated counterclockwise, so that the ink residue which has been removed in the previous operation is removed from the surface of roller 17 by scraper 25. Thus, the surface of sealing roller 17 is always kept clean. In an alternative embodiment, the removed ink residue on roller 17 can be scraped by allowing roller 17 to turn a few times in contact with nozzle surface 2 whenever a sealing operation is effected. This can be accomplished by driving sealing roller 17 by a motor in counterclockwise direction.

Since the wiping actions of the cleaning and sealing rollers are effected in vertical direction, namely, parallel to the direction of arrangement of nozzle openings of multi-color head, there is little or no likelihood of ink residues of different colors being mixed up.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. An ink jet printer comprising:
    an eccentric guide shaft;
    an ink writing head having a nozzle surface, the writing head being adapted to be reciprocably moved along said guide shaft to scan a print line during print mode and moved to a cleaning position outside said print line during non-print mode;
    nozzle cleaning means located adjacent said cleaning position for movably supporting a liquid-absorbing cleaning tape along a path parallel to and adjacent to said nozzle surface; and
    drive means for rotating said guide shaft about the eccentric axis thereof and moving said tape along said path during said non-print mode so that said nozzle surface moves in a substantially circular path to permit a section of said tape to provide a wiping action over said nozzle surface.

2. An ink jet printer as claimed in claim 1, wherein said nozzle cleaning means comprises a roller formed of an elastic material, a supply reel and a takeup reel, said tape being supported between said reels and looped on said roller, and wherein said drive means includes means for rotating said roller in a direction opposite to the direction of movement of said nozzle surface.

3. An ink jet printer as claimed in claim 1, wherein said writing head is adapted to be movable to a sealing position outside said print line during said non-print mode, further comprising nozzle sealing means located adjacent said sealing position for providing a sealing contact with said nozzle surface when same moves in said circular path.

4. An ink jet printer as claimed in claim 3, wherein said sealing means comprises a second roller formed of an elastic material and means for scraping impurities on said second roller.

5. An ink jet printer as claimed in claim 1, wherein said writing head has a series of nozzle openings arranged on said nozzle surface in parallel to the direction of movement of said cleaning tape.

6. An ink jet printer as claimed in claim 1, wherein said writing head is a multi-color head having a plurality of groups of nozzle openings, the nozzle openings of each group being adapted to eject ink streams of a respective color and arranged in series in a direction parallel to the direction of movement of said cleaning tape in side-by-side relationship with the nozzle openings of the other group.

* * * * *